(12) United States Patent
Lee et al.

(10) Patent No.: US 9,154,195 B2
(45) Date of Patent: Oct. 6, 2015

(54) METHOD AND APPARATUS FOR FORMING BEAM THROUGH ONE-WAY COOPERATIVE CHANNEL

(71) Applicant: Electronics and Telecommunications Research Institute, Daejeon (KR)

(72) Inventors: Juyul Lee, Seoul (KR); Keun Young Kim, Gyeonggi-do (KR); Seong Chul Cho, Daejeon (KR); Seung-Hwan Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/041,632

(22) Filed: Sep. 30, 2013

(65) Prior Publication Data
US 2014/0355704 A1  Dec. 4, 2014

(30) Foreign Application Priority Data

Jun. 4, 2013  (KR) .......................... 10-2013-0064281

(51) Int. Cl.
*H04B 7/02* (2006.01)
*H04B 7/04* (2006.01)
*H04B 7/06* (2006.01)

(52) U.S. Cl.
CPC .............. *H04B 7/026* (2013.01); *H04B 7/0426* (2013.01); *H04B 7/0452* (2013.01); *H04B 7/0617* (2013.01)

(58) Field of Classification Search
None
See application file for complete search history.

(56) References Cited

U.S. PATENT DOCUMENTS

| 8,254,318 | B2 | 8/2012 | Monogioudis et al. | |
|---|---|---|---|---|
| 2009/0323773 | A1* | 12/2009 | Bala et al. | 375/141 |
| 2011/0009125 | A1* | 1/2011 | Shin et al. | 455/452.1 |
| 2011/0211487 | A1 | 9/2011 | Han et al. | |
| 2011/0319092 | A1* | 12/2011 | Kim et al. | 455/452.1 |
| 2012/0250550 | A1* | 10/2012 | Gomadam et al. | 370/252 |
| 2014/0204874 | A1* | 7/2014 | Kim et al. | 370/329 |

FOREIGN PATENT DOCUMENTS

| KR | 10-2010-0046338 A | 5/2010 |
|---|---|---|
| KR | 10-2010-0086407 A | 7/2010 |
| KR | 10-2011-0005362 A | 1/2011 |

OTHER PUBLICATIONS

Eduard A. Jorswieck et al., "Complete characterization of the Pareto boundary for the MISO interference channel", IEEE Transactions on Signal Processing, vol. 56. No. 10, pp. 5292-5296, Oct. 2008.
Juyul Lee et al., "Linear Beamforming with One-Way Cooperation for MISO Interference Channels", The 77th IEEE VTC, Dresden, Germany, Jun. 2-5, 2013.

* cited by examiner

*Primary Examiner* — Adolf Dsouza
(74) *Attorney, Agent, or Firm* — Rabin & Berdo, P.C.

(57) ABSTRACT

A method of connecting base stations by a one-way cooperative channel forming a beam is provided. Since it is possible to determine directions of beams and to distribute power components by small amounts of calculations, it is possible to realize the base stations in a one-way cooperative situation with small expenses. In addition, the base stations according to the exemplary embodiment of the present invention may minimize the influence of interference generated by signals transmitted by other base stations through the one-way cooperative channel and the influence of interference generated by signals transmitted to other terminals.

15 Claims, 10 Drawing Sheets

(A)

(B)

(A)

(B)

METHOD AND APPARATUS FOR FORMING BEAM THROUGH ONE-WAY COOPERATIVE CHANNEL

CROSS-REFERENCE TO RELATED APPLICATION

This application claims priority to and the benefit of Korean Patent Application No. 10-2013-0064281 filed in the Korean Intellectual Property Office on Jun. 4, 2013, the entire contents of which are incorporated herein by reference.

BACKGROUND OF THE INVENTION (a) Field of the Invention

The present invention relates to a method and an apparatus for base stations of a multi-cell environment forming a beam through a one-way cooperative channel.

(b) Description of the Related Art

When a plurality of base stations transmit signals to a plurality of terminals, neighboring base stations may share a radio channel. In this case, an interface may be generated by the neighboring base stations. In order to improve transmission efficiency and perceptible quality of a user, it is regarded to be important to overcome interference from the neighboring base stations.

In order to overcome the interference from the neighboring base stations, a cooperative communication network in which the neighboring base stations may cooperate with each other is emerging as an alternative. In the cooperative communication network, the terminals transmit channel information of the radio channel to the base stations, respectively, and the channel information received by the base stations from the terminals is shared by the neighboring base stations. In a complete cooperative communication network where the base stations share all the channel information transmitted to the neighboring base stations, since the entire network is operated like one base station, maximum performance may be theoretically generated. However, due to capacity limits of a cooperative channel, complete cooperation may not be realized.

SUMMARY OF THE INVENTION

According to an exemplary embodiment of the present invention, a method of connecting base stations by a one-way cooperative channel forming a beam is provided.

According to an exemplary embodiment of the present invention, a method of a base station forming a beam is provided. The beam forming method includes calculating a first precoding vector for a first terminal of a plurality of terminals and a second precoding vector for a second terminal among the plurality of terminals based on channel information received from the plurality of terminals, performing linear combination on the first precoding vector and the second precoding vector to generate a third precoding vector, normalizing the third precoding vector, and multiplying the normalized third precoding vector by a signal to be transmitted to the first terminal to form a beam.

Calculating a first precoding vector for a first terminal of a plurality of terminals and a second precoding vector for a second terminal among the plurality of terminals based on channel information received from the plurality of terminals may further include calculating the first precoding vector by a maximum ratio transmission (MRT) method, and calculating the second precoding vector by a zero-forcing (ZF) method.

The beam forming method may further include transmitting information on the third precoding vector to a base station neighboring the base station through a one-way cooperative channel.

Performing linear combination on the first precoding vector and the second precoding vector to generate a third precoding vector may include calculating a linear combination coefficient $\lambda$ for linear combination of the first precoding vector and the second precoding vector based on the channel information.

The linear combination coefficient $\lambda$ may be calculated by an equation $$\lambda = \min\left(\frac{\delta}{\alpha \|h_{11}\| \sqrt{P_1}}, 1\right).$$

The first terminal may be positioned in coverage of the base station, and the second terminal may be positioned outside coverage of the base station.

According to another exemplary embodiment of the present invention, another method of a base station forming a beam is provided. The beam forming method includes configuring directions of a first precoding vector for a first terminal of a plurality of terminals and a second precoding vector for a second terminal of the plurality of terminals based on channel information received from the plurality of terminals, distributing power components for the first terminal and the second terminal to configure magnitudes of the first precoding vector and the second precoding vector, and forming beams to be transmitted to the first terminal and the second terminal based on the directions and the magnitudes of the first precoding vector and the second precoding vector.

Configuring directions of a first precoding vector for a first terminal of a plurality of terminals and a second precoding vector for a second terminal of the plurality of terminals based on channel information received from the plurality of terminals may include calculating the first precoding vector and the second precoding vector using the ZF method.

Distributing power components for the first terminal and the second terminal to configure magnitudes of the first precoding vector and the second precoding vector may include receiving a third precoding vector calculated by a base station neighboring the base station from the neighboring base station, calculating effective reverse channel coefficients for the first terminal and the second terminal using the channel information, the third precoding vector, and a variance of background noise, and allocating power components to the first precoding vector and the second precoding vector using the effective reverse channel coefficients.

Allocating power components to the first precoding vector and the second precoding vector using the effective reverse channel coefficients may include allocating power components to the first precoding vector and the second precoding vector using the effective reverse channel coefficients through a water-filling technique.

The first terminal may be positioned in coverage of the base station and coverage of the neighboring base station, and the second terminal may be positioned in coverage of the base station and outside coverage of the neighboring base station.

Forming beams to be transmitted to the first terminal and the second terminal based on the directions and the magnitudes of the first precoding vector and the second precoding vector may include normalizing the first precoding vector and the second precoding vector whose magnitudes and directions are determined.

According to another exemplary embodiment of the present invention, a base station for forming a beam to be transmitted to at least one terminal of a plurality of terminals is provided. The base station includes a vector direction configuration unit for configuring directions of a first precoding vector for a first terminal of a plurality of terminals and a second precoding vector for a second terminal of the plurality of terminals based on channel information received from the plurality of terminals, a power distribution unit for distributing power components for the first terminal and the second terminal to configure magnitudes of the first precoding vector and the second precoding vector, and a normalization unit for normalizing the first precoding vector and the second precoding vector whose magnitudes and directions are determined.

The vector direction configuration unit may calculate the first precoding vector and the second precoding vector using the ZF method.

The power distribution unit may include a base station communication unit for receiving a third precoding vector calculated by a base station neighboring the base station from the neighboring base station, and a reverse channel coefficient calculator for calculating effective reverse channel coefficients for the first terminal and the second terminal using the channel information, the third precoding vector, and a variance of background noise. Power components may be allocated to the first precoding vector and the second precoding vector using the effective reverse channel coefficients.

The power distribution unit may allocate power components to the first precoding vector and the second precoding vector using the effective reverse channel coefficients through the water-filling technique.

The first terminal may be positioned in coverage of the base station and coverage of the neighboring base station, and the second terminal may be positioned in coverage of the base station and outside coverage of the neighboring base station.

The base station may further include a channel information storage unit for storing the channel information and delivering the stored channel information to the vector direction configuration unit and the reverse channel coefficient calculator.

DETAILED DESCRIPTION OF THE EMBODIMENTS

Figure 1:
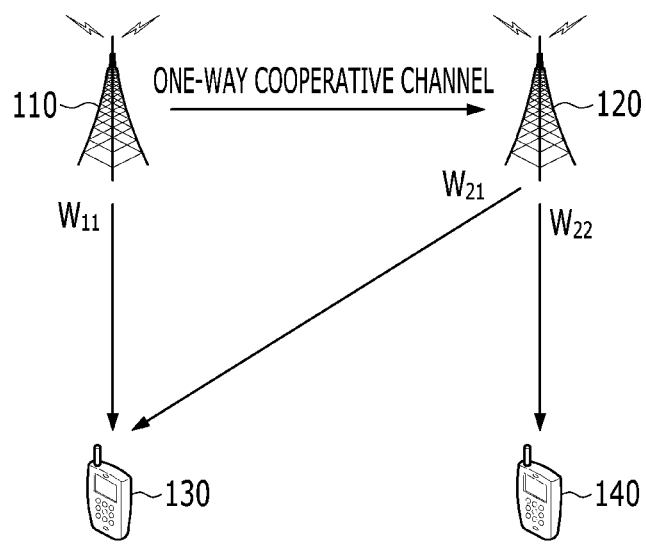
FIG. 1 is a view illustrating a one-way cooperative communication network according to an exemplary embodiment of the present invention.
Figure 1:
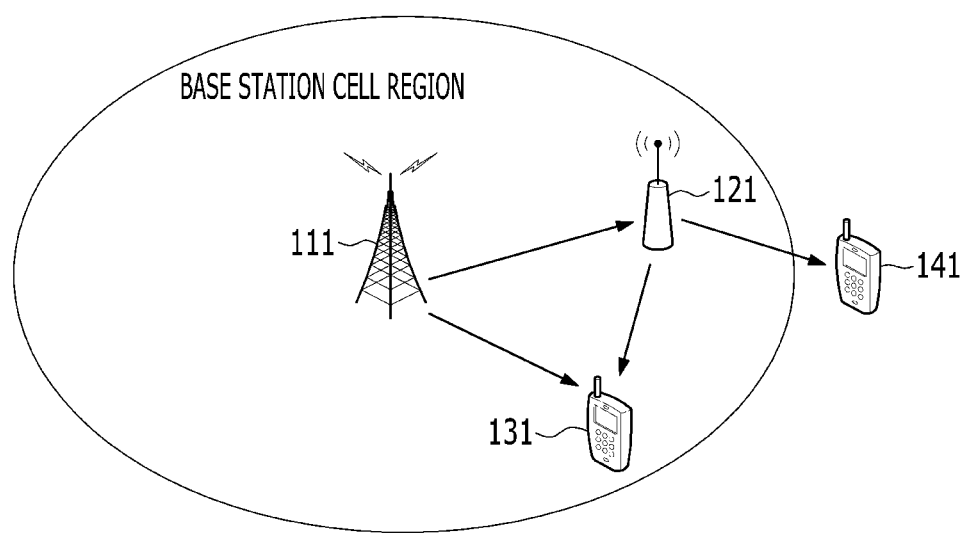

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the entire specification, a terminal may refer to a mobile terminal (MT), a mobile station (MS), a subscriber station (SS), a portable subscriber station (PSS), an access terminal (AT), and a user equipment (UE), and may include entire or partial functions of the MT, the MS, the SS, the PSS, the AT, and the UE.

In addition, a base station (BS) may refer to a nodeB (node B), an evolved node B (eNodeB), an access point (AP), a radio access station (RAS), a base transceiver station (BTS), and a mobile multihop relay (MMR)-BS, and may include entire or partial functions of the nodeB, the eNodeB, the AP, the RAS, the BTS, and the MMR-BS.

In the entire specification, unless explicitly described to the contrary, the word "comprise" and variations such as "comprises" or "comprising" will be understood to imply the inclusion of stated elements but not the exclusion of any other elements. In addition, the terms " . . . unit", " . . . er", "module", and "block" described in the specification mean units that process at least one function or operation, which may be realized by hardware, software, or a combination of hardware and software.

FIG. 1 is a view illustrating a one-way cooperative communication network according to an exemplary embodiment of the present invention.

Referring to A of FIG. 1, a base station1 110 and a base station2 120 realize cooperative communications through a one-way cooperative channel from the base station1 110 to the base station2 120. In a one-way cooperative communication network illustrated in A of FIG. 1, the base station1 110 may transmit a signal to a terminal1 130 through a precoding vector $w_{11}$, the base station2 120 may transmit a signal to a terminal2 140 through a precoding vector $w_{22}$, and may transmit a signal to the terminal1 130 through a precoding vector $w_{21}$. That is, the base station2 120 may receive information on the base station1 110 through the one-way cooperative channel and may transmit a signal to the terminal1 130, and a precoding vector is displayed as $w_{-21}$.

Referring to B of FIG. 1, a base station1 111 corresponds to the base station1 110 of A of FIG. 1, and a relay 121 of B of FIG. 1 corresponds to the base station2 120 of A of FIG. 1. That is, a terminal1 131 of B of FIG. 1 may receive signals from the base station1 111 and the relay 121, however a terminal2 141 is positioned outside a cell of the base station 111 and may receive a signal only from the relay 121.

At this time, since the base station1 111 and the relay 121 of B of FIG. 1 have a hierarchical structure, it may be considered that the base station and the relay are connected by the one-way cooperative channel. That is, according to the exemplary embodiment of the present invention, data information and channel information of the base station1 may be delivered to the relay through the one-way cooperative channel. In addition, the exemplary embodiment of the present invention may be applied when respective cells such as femtocells have a hierarchical structure.

Figure 2:
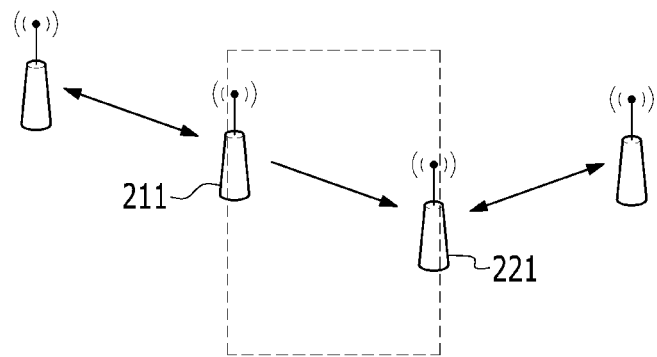
FIG. 2 is a view illustrating a network to which base stations according to an exemplary embodiment of the present invention may be applied.
Figure 2:
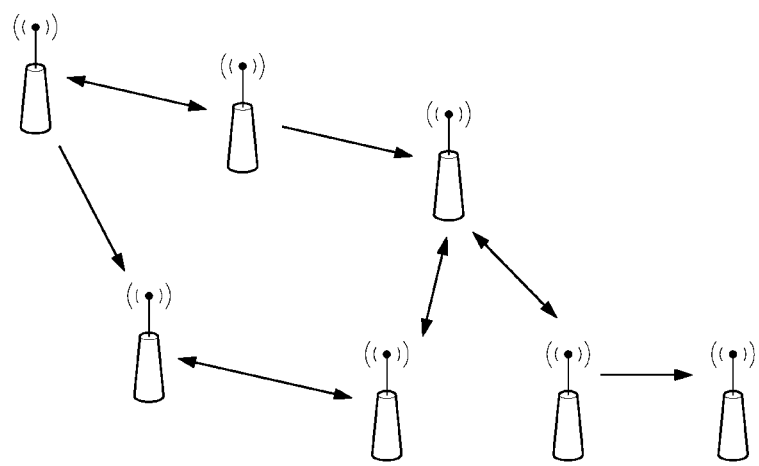

FIG. 2 is a view illustrating a network to which base stations according to an exemplary embodiment of the present invention may be applied.

Referring to A of FIG. 2, illustrated base stations are connected to each other by a two-way channel. However, a base station1 211 and a base station2 221 are connected to each other by a one-way channel from the base station1 to the base station2. According to the exemplary embodiment of the present invention, the base station1 211 may deliver information on a precoding vector generated by the base station1 to the base station2 221 through a one-way cooperative channel.

Referring to B of FIG. 2, illustrated base stations are connected to each other by a two-way channel or a one-way channel. In this case, the exemplary embodiment of the present invention may be applied to a part in which the base stations cooperate with each other by the one-way channel.

According to the exemplary embodiment of the present invention, base stations that deliver information to neighboring base stations through a one-way cooperative channel are referred to as helper base stations, and base stations that receive information through the one-way cooperative channel are referred to as helpee base stations. In addition, according to the exemplary embodiment of the present invention, a terminal1 is positioned in coverage of a base station1 and a terminal2 is positioned outside coverage of the base station1 and is positioned in coverage of a base station2. Hereinafter, a method and an apparatus (a base station) for forming a beam through a precoding vector according to the exemplary embodiment of the present invention will be described.

In a one-way cooperative communication network according to the exemplary embodiment of the present invention, when it is assumed that Gaussian coding is used, maximum throughput $R_1$ and $R_2$ of signals transmitted to terminals may be represented by Equation 1.

$$\text{Terminal1: } R_1 = \frac{1}{2}\log_2\left(1 + \frac{|h_{11}^T w_{11} + h_{12}^T w_{21}|^2}{\sigma_1^2 + |h_{12}^T w_{22}|^2}\right) \quad \text{(Equation 1)}$$

$$\text{Terminal2: } R_2 = \frac{1}{2}\log_2\left(1 + \frac{|h_{22}^T w_{22}|^2}{\sigma_2^2 + |h_{21}^T w_{11} + h_{22}^T w_{21}|^2}\right)$$

Power conditions provided to base stations may be represented by Equation 2.

Terminal1: $\|w_{11}\|^2 \leq P_1$

Terminal2: $\|w_{21}\|^2 + \|w_{22}\|^2 \leq P_2$ (Equation 2)

Since performance indices of the maximum throughput may be affected by a magnitude of interference, normalized interference correlation coefficients may be defined by Equation 3.

$$\alpha = \frac{|h_{21}^T h_{11}|}{|h_{11}^T h_{11}|}, \quad \beta = \frac{|h_{12}^T h_{22}|}{|h_{22}^T h_{22}|} \quad \text{(Equation 3)}$$

First, a precoding vector $w_{11}$ for a helper base station forming a beam is calculated.

According to the exemplary embodiment of the present invention, in order for the helper base station to calculate an optimized precoding vector $W_{11}^{opt}$, a maximum ratio transmission (MRT) method and a zero-forcing (ZF) method may be linearly combined with each other as illustrated in Equation 4.

$$W_{11}^{opt} = \frac{\lambda w_{11}^{MRT} + (1-\lambda)w_{11}^{ZF}}{\|\lambda w_{11}^{MRT} + (1-\lambda)w_{11}^{ZF}\|}\sqrt{P_1} \quad \text{(Equation 4)}$$

$$w_{11}^{MRT} = \frac{h_{11}}{\|h_{11}\|}, \quad w_{11}^{ZF} = \frac{\Pi_{h_{21}}^\perp h_{11}}{\|\Pi_{h_{21}}^\perp h_{11}\|},$$

$$\Pi_{h_{21}}^\perp = I - h_{21}(h_{21}^T h_{21})^{-1} h_{21}^T$$

Referring to the Equation 4, a magnitude of the optimal precoding vector $W_{11}^{opt}$ is $\sqrt{P_1}$ and a direction of the optimal precoding vector $W_{11}^{opt}$ may be between a direction of a precoding vector $w_{11}^{MRT}$ found by the MRT method and a direction of a precoding vector $w_{11}^{ZF}$ found by the ZF method. At this time, a number between 0 and 1λ is used for a linear combination of the MRT method and the ZF method.

The precoding vector $w_{11}^{MRT}$ found by the MRT method and the precoding vector $w_{11}^{ZF}$ found by the ZF method may be calculated through values that optimize Equations 5 and 6, respectively.

maximize $h_{11}^T w_{11}$ subject to $\|w_{11}\|^2 \leq P_1$ (Equation 5)

maximize $h_{11}^T w_{11}$ subject to $h_{21}^T w_{11} = 0$ $\|w_{11}\|^2 \leq P_1$ (Equation 6)

Figure 3:
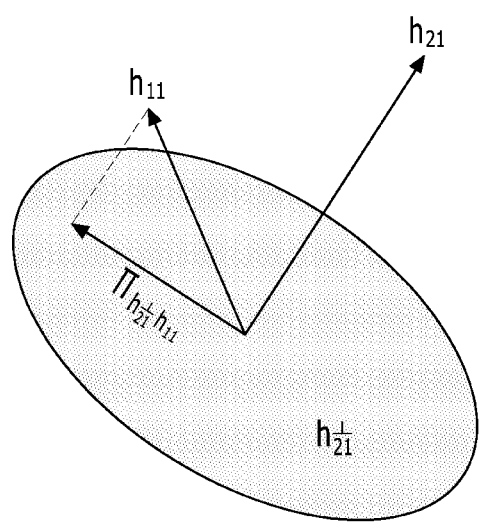
FIG. 3 is a view geometrically illustrating Equation 4 according to an exemplary embodiment of the present invention.

The values that optimize Equations 5 and 6 may be described through the vector drawing of FIG. 3. That is, FIG. 3 is a view that geometrically describes Equation 4. Referring to FIG. 3, $\pi_{h_{21}}^\perp h_{11}$ is a vector obtained by orthographically projecting a vector $h_{11}$ to a plane $h_{21}^\perp$ perpendicular to $h_{21}$.

Figure 4:
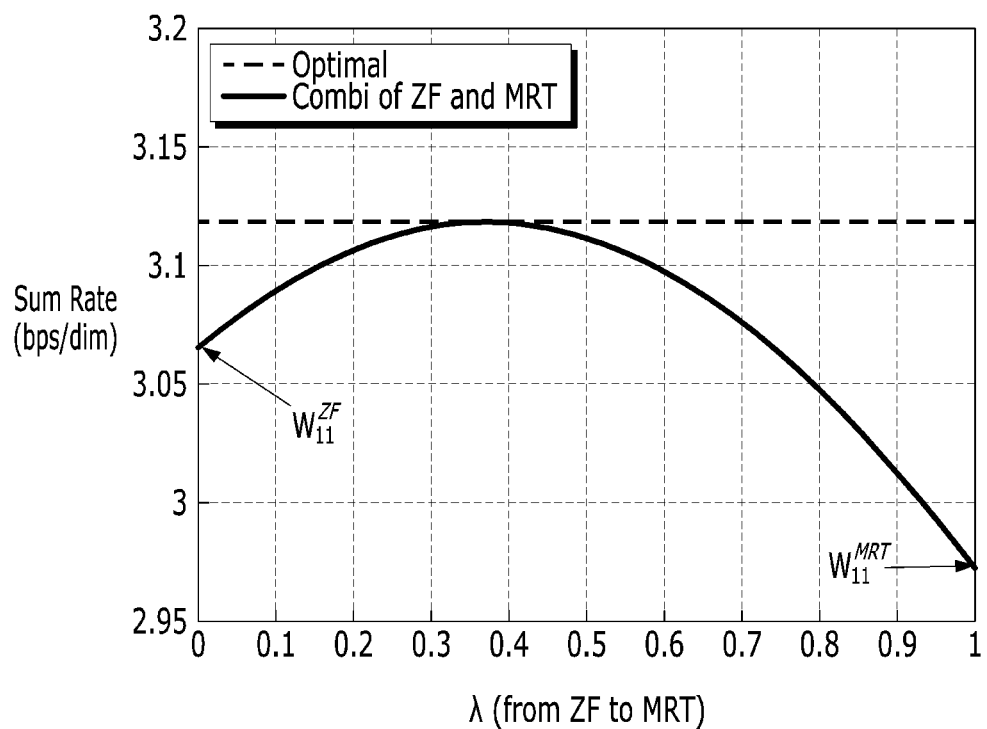
FIG. 4 is a graph illustrating a sum rate when $P_1$ is 10 dB and both $\alpha$ and $\beta$ are 0.4 according to an exemplary embodiment of the present invention.

In order to grasp a change in a sum rate in accordance with λ, the graph of FIG. 4 may be referred to. FIG. 4 is a graph illustrating a sum rate when $P_1$ is 10 dB and both α and β are 0.4 according to an exemplary embodiment of the present invention. Referring to FIG. 4, it is noted that the sum rate is maximal when λ is between 0.3 and 0.4 and an optimization precoding vector is $w_{11}^{ZF}$ when λ is 0 and is $w_{11}^{MRT}$ when λ is 1. Therefore, the optimal precoding vector $W_{11}^{opt}$ may be calculated when λ is a specific value between 0 and 1.

Figure 5:
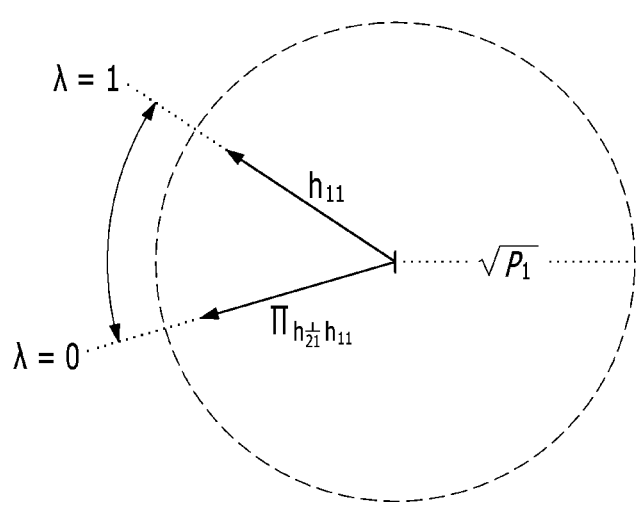
FIG. 5 is a view illustrating a relationship between vectors $h_{11}$ and $\pi_{h_{21}}^{-1} h_{11}$ and $\lambda$ according to an exemplary embodiment of the present invention.

FIG. 5 is a view illustrating a relationship between vectors $h_{11}$ and $\pi_{h_{21}}^\perp h_{11}$ and λ according to an exemplary embodiment of the present invention. According to the exemplary embodiment of the present invention, in order to determine λ, a new optimization method that may solve the Equations 5 and 6 is used.

Equation 7 illustrates an optimization method according to an exemplary embodiment of the present invention.

maximize $h_{11}^T w_{11}$ subject to $|h_{21}^T w_{11}|^2 \leq \delta^2$ $\|w_{11}\|^2 \leq P_1$ (Equation 7)

Referring to Equation 7, when δ is infinite, $W_{11}^{opt}$ is $w_{11}^{MRT}$ and, when δ is 0, $W_{11}^{opt}$ is $w_{11}^{ZF}$. In Equation 7, an amount of interference made by the helper base station with the helpee base station may be controlled by controlling δ. That is, since $h_{21}^\perp W_{11}$ is a variable by which a throughput of the terminal2 may be determined (refer to Equation 1), the throughput $R_2$ of the terminal2 may be improved by controlling δ.

Figure 6:
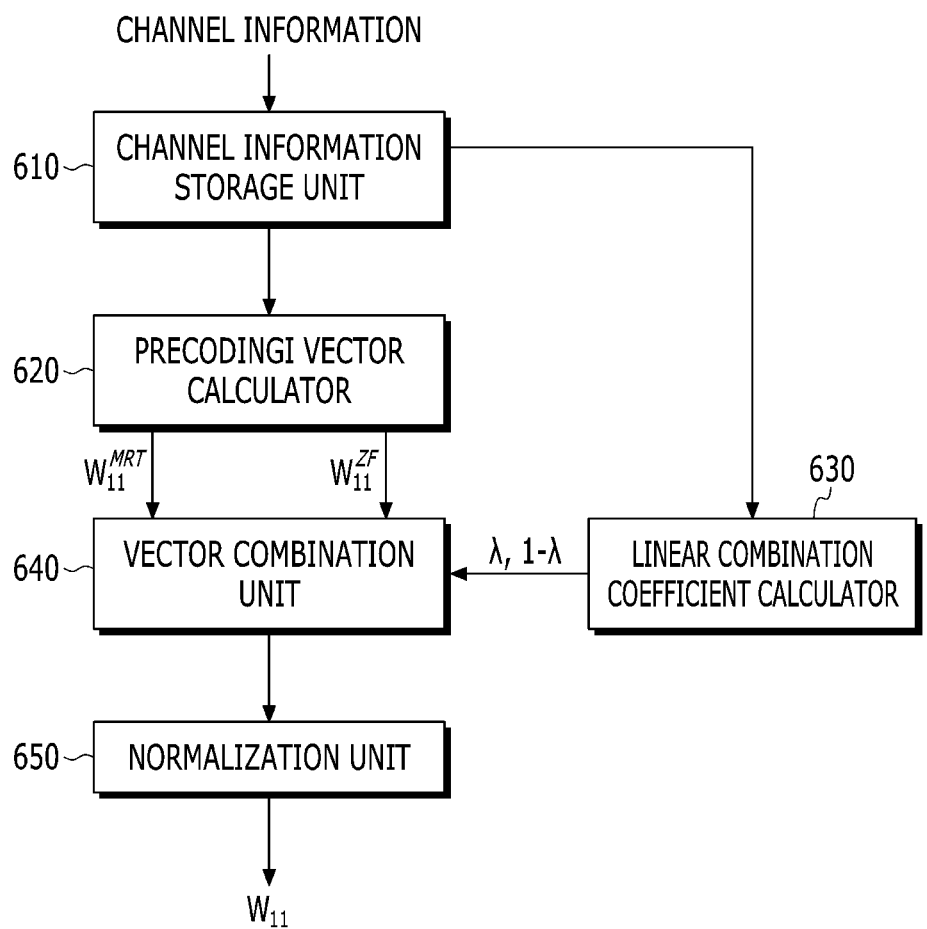
FIG. 6 is a view illustrating a helper base station according to an exemplary embodiment of the present invention.

FIG. 6 is a view illustrating a helper base station according to an exemplary embodiment of the present invention. In a helper base station according to the exemplary embodiment of the present invention, the precoding vector $W_{11}^{opt}$ may be calculated.

Referring to FIG. 6, a helper base station according to the exemplary embodiment of the present invention includes a channel information storage unit 610, a precoding vector calculator 620, a linear combination coefficient calculator 630, a vector combination unit 640, and a normalization unit 650.

The channel information storage unit 610 stores channel information received from a terminal, and may deliver the stored channel information to the precoding vector calculator 620 and the linear combination coefficient calculator 630.

The precoding vector calculator 620 may calculate the precoding vector $w_{11}^{MRT}$ by the MRT method and the precoding vector $w_{11}^{ZF}$ by the ZF method based on the channel information. The precoding vector calculator 620 according to the exemplary embodiment of the present invention may calculate $w_{11}^{MRT}$ and $w_{11}^{ZF}$ through Equation 4.

The linear combination coefficient calculator 630 may calculate a coefficient λ for linear combination of $w_{11}^{MRT}$ and $w_{11}^{ZF}$ based on transmission power of the helper base station, the channel information, and δ.

At this time, the linear combination coefficient calculator 630 may calculate the coefficient λ by Equation 8.

$$\lambda = \min\left(\frac{\delta}{\alpha\|h_{11}\|\sqrt{P_1}}, 1\right) \qquad \text{(Equation 8)}$$

The vector combination unit 640 may perform linear combination on the precoding vector $w_{11}^{MRT}$ by the MRT method and the precoding vector $w_{11}^{ZF}$ by the ZF method based on the coefficient calculated by the linear combination coefficient calculator 630.

The normalization unit 650 normalizes the precoding vector obtained by the vector combination unit 640 performing linear combination.

Then, the helper base station transmits a signal by which the normalized precoding vector is multiplied to the terminal in accordance with the transmission power.

Next, the precoding vectors $w_{21}$ and $w_{22}$ required for a helpee base station to form a beam are calculated.

According to the present invention, the base station2 is the helpee base station and the precoding vector $w_{11}$ calculated by the helper base station may be provided through a one-way cooperative channel. At this time, since the base station2 may simultaneously transmit the signal to the terminal1 and the terminal2, a channel between the base station2 and the terminal may be considered as a multi-antenna broadcast channel.

Figure 7:
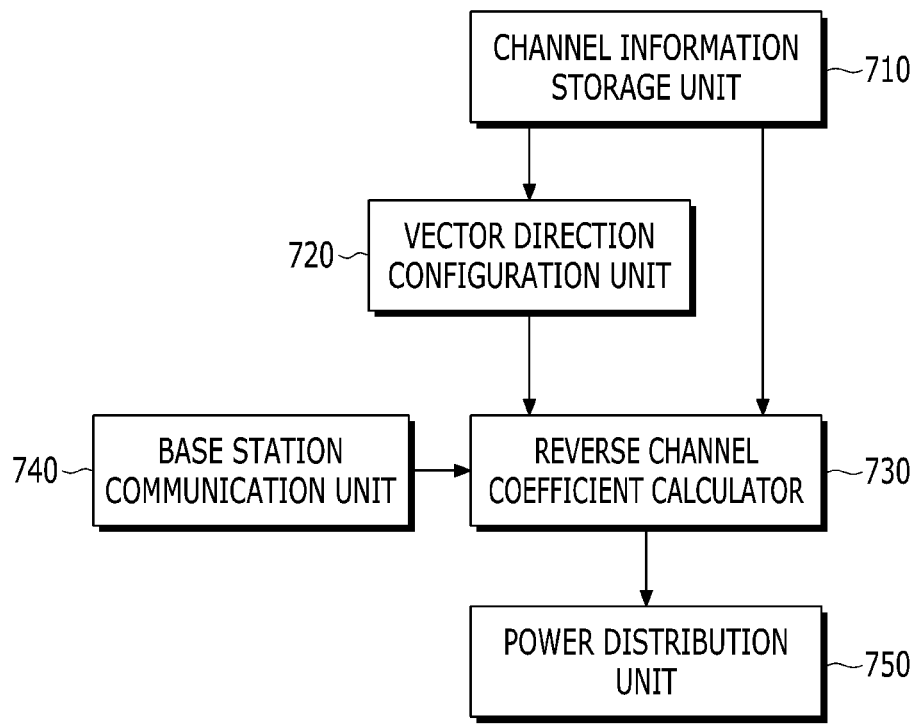
FIG. 7 is a view illustrating a helpee base station according to an exemplary embodiment of the present invention.

FIG. 7 is a view illustrating a helpee base station according to an exemplary embodiment of the present invention. Referring to FIG. 7, a helpee base station according to the exemplary embodiment of the present invention includes a channel information storage unit 710, a vector direction configuration unit 720, a reverse channel coefficient calculator 730, a base station communication unit 740, and a power distribution unit 750.

The channel information storage unit 710 stores channel information received from a terminal, and may deliver the stored channel information to the vector direction configuration unit 720 and the reverse channel coefficient calculator 730.

The vector direction configuration unit 720 may configure directions of the precoding vectors $w_{21}$ and $w_{22}$.

The base station communication unit 740 receives the precoding vector $w_{11}$ of the helper base station from the helper base station to deliver the received precoding vector $w_{11}$ to the reverse channel coefficient calculator 730.

The reverse channel coefficient calculator 730 may calculate effective reverse channel coefficients through channel information, the precoding vector $w_{11}$ of the helper base station, and a variance a of background noise.

The power distribution unit 750 may properly distribute power $\|w_{21}\|^2$ of a beam transmitted to the terminal1 and power $\|w_{22}\|^2$ of a beam transmitted to the terminal2. At this time, squares of the precoding vectors used for forming the respective beams mean power components of the respective beams. According to the exemplary embodiment of the present invention, the power distribution unit 750 may include the base station communication unit 740 and the reverse channel coefficient calculator 730. The power distribution unit 750 may normalize a precoding vector of which magnitude and direction are determined.

Equation 9 represents power components of beams allocated to respective terminals.

a beam transmitted to the terminal1: $\|w_2\|^2 = P_{21}$ a beam transmitted to the terminal2: $\|w_{22}\|^2 = P_{22}$ $$P_2 = P_{21} + P_{22} \qquad \text{(Equation 9)}$$

At this time, when power distribution amounts and directions are simultaneously determined, it is possible to maximize performance of the base station. However, since complexity is increased, according to the exemplary embodiment of the present invention, the directions of the beams are first configured and then the power components of the beams are distributed.

First, the vector direction configuration unit 720 calculates Equation 10 using channel information items $h_{11}$, $h_{12}$, $h_{21}$, and $h_{22}$ received from the channel information storage unit 710 to configure the directions of the respective precoding vectors.

$$w_{21}^{ZF} = \frac{\Pi_{\bar{h}_{22}} h_{12}}{\|\Pi_{\bar{h}_{22}} h_{12}\|} \sqrt{P_{21}} \qquad \text{(Equation 10)}$$

$$w_{22}^{ZF} = \frac{\Pi_{\bar{h}_{12}} h_{22}}{\|\Pi_{\bar{h}_{12}} h_{22}\|} \sqrt{P_{22}}$$

At this time, the precoding vectors of the Equation 10 are obtained by the ZF method because the precoding vectors formed by the ZF method in a multi-antenna broadcasting channel environment with a high signal-to-noise ratio (SNR) are not remarkably different from the optimized precoding vector in terms of performance. In addition, when the directions of the beams are configured by the ZF method, the power components may be easily distributed.

Equation 11 obtained by substituting Equation 10 for Equation 1 may be used for calculating the effective reverse channel coefficients and distributing the power components.

Terminal1: $R_1 \cong$ (Equation 11)

$$\frac{1}{2}\log_2\left(\left[1+\frac{|h_{11}^T w_{11}|^2}{\sigma_1^2}\right]\left[1+\frac{\|\Pi_{h_{22}}^\perp h_{12}\|^2}{\sigma_1^2+|h_{11}^T w_{11}|^2}P_{21}\right]\right)$$

Terminal2: $R_2 = \frac{1}{2}\log_2\left(1+\frac{\|\Pi_{h_{12}}^\perp h_{22}\|^2}{\sigma_2^2+|h_{21}^T w_{11}|^2}P_{22}\right)$ Equation 11 represents maximum throughput of the respective terminals, and $P_{21}$ and $P_{22}$ may satisfy $P_2 = P_{21} + P_{22}$.

At this time, multiplication factors multiplied by $P_{21}$ and $P_{22}$ of Equation 11 are referred to as $N_{21}$ and $N_{22}$, and $N_{21}$ and $N_{22}$ may be represented by Equation 12.

$$N_{21} = \frac{\sigma_1^2 + |h_{11}^T w_{11}|^2}{\|\Pi_{h_{22}}^\perp h_{12}\|^2}$$ (Equation 12)

$$N_{22} = \frac{\sigma_2^2 + |h_{21}^T w_{11}|^2}{\|\Pi_{h_{12}}^\perp h_{22}\|^2}$$

The multiplication factors $N_{21}$ and $N_{22}$ are referred to as the effective reverse channel coefficients, and the reverse channel coefficient calculator 730 may calculate $N_{21}$ and $N_{22}$ through the channel information items $h_{11}$, $h_{12}$, $h_{21}$, and $h_{22}$, the variance a of the background noise, and the precoding vector $w_{11}$ of the helper base station. At this time, the variance of the background noise may be divided into $\sigma_1$ for the terminal1 and $\sigma_2$ for the terminal2.

Figure 8:
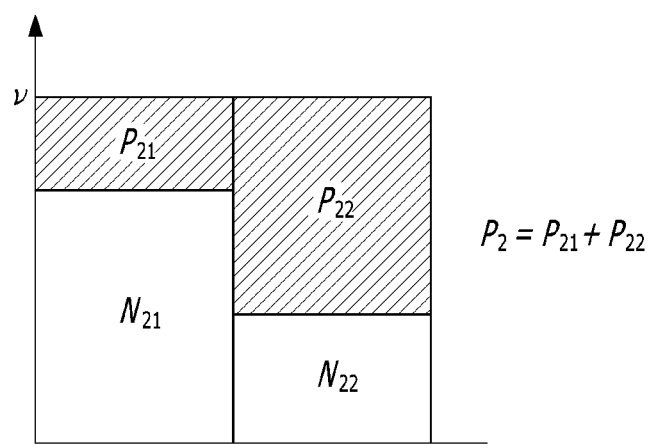
FIG. 8 is a view illustrating a power distribution plan of a helpee base station according to an exemplary embodiment of the present invention.

According to the exemplary embodiment of the present invention, $P_{21}$ and $P_{22}$ may be distributed using the effective reverse channel coefficients. FIG. 8 is a view illustrating a power distribution plan of a helpee base station according to an exemplary embodiment of the present invention. Referring to FIG. 8, the sum of the effective reverse channel coefficients $N_{21}$ and $N_{22}$ and the sum of the power components $P_{21}$ and $P_{22}$ of the precoding vectors calculated by Equation 12 are the same ($N_{21}+P_{21}=N_{22}+P_{22}$).

That is, in the power distribution plan of FIG. 8, $N_{21}$ is larger than $N_{22}$, and after an arbitrary horizontal level v is configured, differences between the horizontal level v and the effective reverse channel coefficients are determined as $P_{21}$ and $P_{22}$. Such a method is referred to as a water-filling technique.

According to the exemplary embodiment of the present invention illustrated in FIG. 8, since $N_{21}$ is larger than $N_{22}$ and $P_{21}$ is smaller than $P_{22}$, since the sum of $P_{21}$ and $P_{22}$ must be $P_2$, $P_{21}$ and $P_{22}$ may be calculated by Equation 13.

$$P_{21} = \frac{P_2 + N_{22} - N_{21}}{2}$$ (Equation 13)

$$P_{22} = \frac{P_2 + N_{21} - N_{22}}{2}$$

That is, according to the exemplary embodiment of the present invention, power components to be allocated to the respective precoding vectors are determined from the effective reverse channel coefficients through the water-filling technique illustrated in FIG. 8, and magnitudes and directions of the precoding vectors for the terminal1 and the terminal2 are finally determined.

Then, the normalization unit normalizes the precoding vectors for the terminal1 and the terminal2, and the helpee base station transmits signals by which the normalized precoding vectors are multiplied are transmitted to the terminal1 and the terminal2, respectively.

Figure 9:
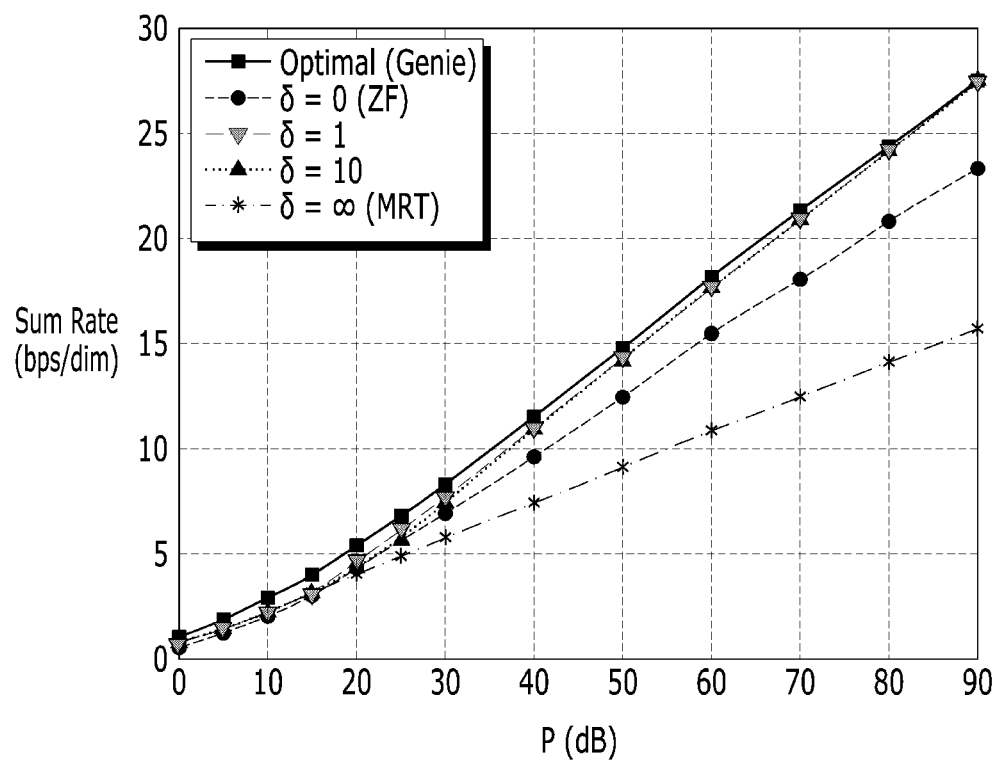
FIGS. 9 and 10 are views illustrating a sum rate of base stations according to an exemplary embodiment of the present invention.
Figure 10:
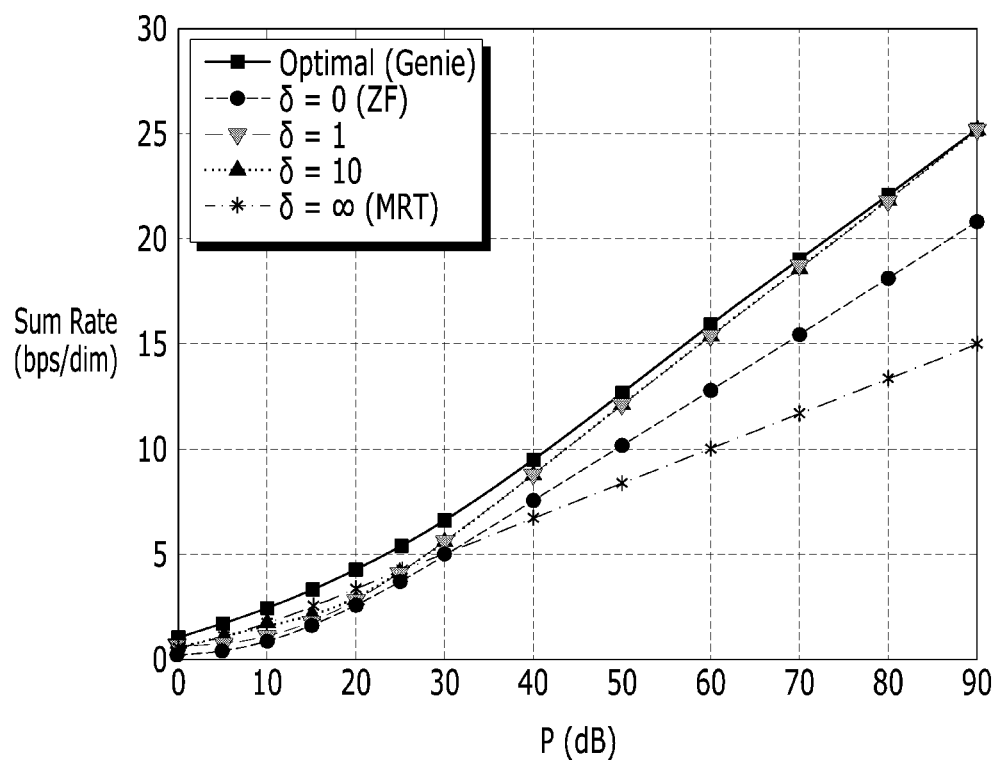

FIGS. 9 and 10 are views illustrating a sum rate of base stations according to an exemplary embodiment of the present invention.

Referring to FIGS. 9 and 10, in an optimal graph with the best sum rate, base stations are connected to each other through a two-way cooperative channel. δ is 0 when the ZF method is used and δ is −∞ when the MRT method is used. That is, the exemplary embodiment of the present invention is applied to a graph in which δ is 1 or 10.

At this time, FIG. 9 illustrates a case in which both α and β are 0.4 and interference properly exists, and FIG. 10 illustrates a case in which both α and γ are 0.9 and a large amount of interference exists.

In FIGS. 9 and 10, when δ is commonly 1 or 10, a larger sum rate is obtained than when the ZF or MRT method is used. In addition, as power levels are increased, it is noted that the graph in which δ is 1 or 10 is close to the "Optimal" graph in which the base stations are connected to each other through the two-way cooperative channel.

That is, the base stations according to the exemplary embodiment of the present invention have better performances than beam forming by the conventional ZF or MRT method in an environment where power levels are increased to a no less than predetermined degree and have performances close to the two-way cooperative channel as the power levels are increased.

As described above, according to the exemplary embodiment of the present invention, since it is possible to determine directions of beams and to distribute power components by small amounts of calculations, it is possible to realize the base stations in a one-way cooperative situation with small expenses. In addition, the base stations according to the exemplary embodiment of the present invention may minimize the influence of interference generated by signals transmitted by other base stations through the one-way cooperative channel and the influence of interference generated by signals transmitted to other terminals.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of a base station forming a beam, the method comprising:

calculating a first precoding vector for a first terminal of a plurality of terminals and a second precoding vector for a second terminal among the plurality of terminals based on channel information received from the plurality of terminals;

performing linear combination on the first precoding vector and the second precoding vector to generate a third precoding vector;

normalizing the third precoding vector;

multiplying the normalized third precoding vector by a signal to be transmitted to the first terminal to form beams; and transmitting information on the third precoding vector to a base station neighboring the base station through a one-way cooperative channel.

2. The method of claim 1, wherein calculating the first precoding vector for the first terminal of the plurality of terminals and the second precoding vector for the second terminal among the plurality of terminals based on channel information received from the plurality of terminals further comprises:
    calculating the first precoding vector by a maximum ratio transmission (MRT) method; and
    calculating the second precoding vector by a zero-forcing (ZF) method.

3. The method of claim 1, wherein performing linear combination on the first precoding vector and the second precoding vector to generate a third precoding vector comprises calculating a linear combination coefficient λ for linear combination of the first precoding vector and the second precoding vector based on the channel information.

4. The method of claim 3, wherein the linear combination coefficient λ is calculated by an equation $$\lambda = \min\left(\frac{\delta}{\alpha\|h_{11}\|\sqrt{P_1}}, 1\right).$$

5. The method of claim 1, wherein the first terminal is positioned in coverage of the base station and the second terminal is positioned outside coverage of the base station.

6. A method of a base station forming a beam, the method comprising:
    configuring directions of a first precoding vector for a first terminal of a plurality of terminals and a second precoding vector for a second terminal of the plurality of terminals based on channel information received from the plurality of terminals;
    distributing power components for the first terminal and the second terminal to configure magnitudes of the first precoding vector and the second precoding vector; and
    forming beams to be transmitted to the first terminal and the second terminal based on the directions and the magnitudes of the first precoding vector and the second precoding vector,
    wherein distributing power components for the first terminal and the second terminal to configure magnitudes of the first precoding vector and the second precoding vector comprises:
    receiving a third precoding vector calculated by a neighboring base station of the base station from the neighboring base station;
    calculating effective reverse channel coefficients for the first terminal and the second terminal using the channel information, the third precoding vector, and a variance of background noise; and
    allocating power components to the first precoding vector and the second precoding vector using the effective reverse channel coefficients.

7. The method of claim 6, wherein configuring directions of a first precoding vector for a first terminal of a plurality of terminals and a second precoding vector for a second terminal of the plurality of terminals based on channel information received from the plurality of terminals comprises calculating the first precoding vector and the second precoding vector using the ZF method;
    wherein the power distribution unit comprises:
    a base station communication unit for receiving a third precoding vector calculated by a base station neighboring the base station from the neighboring base station; and
    a reverse channel coefficient calculator for calculating effective reverse channel coefficients for the first terminal and the second terminal using the channel information, the third precoding vector, and a variance of background noise,
    wherein power components are allocated to the first precoding vector and the second precoding vector using the effective reverse channel coefficients.

8. The method of claim 6, wherein allocating power components to the first precoding vector and the second precoding vector using the effective reverse channel coefficients comprises allocating power components to the first precoding vector and the second precoding vector using the effective reverse channel coefficients through a water-filling technique.

9. The method of claim 6, wherein the first terminal is positioned in a coverage of the base station and coverage of the neighboring base station, and the second terminal is positioned in coverage of the base station and outside coverage of the neighboring base station.

10. The method of claim 6, wherein forming beams to be transmitted to the first terminal and the second terminal based on the directions and the magnitudes of the first precoding vector and the second precoding vector comprises normalizing the first precoding vector and the second precoding vector whose magnitudes and directions are determined.

11. A base station for forming a beam to be transmitted to at least one terminal of a plurality of terminals, the base station comprising:
    a vector direction configuration unit for configuring directions of a first precoding vector for a first terminal of a plurality of terminals and a second precoding vector for a second terminal of the plurality of terminals based on channel information received from the plurality of terminals;
    a power distribution unit for distributing power components for the first terminal and the second terminal to configure magnitudes of the first precoding vector and the second precoding vector; and
    a normalization unit for normalizing the first precoding vector and the second precoding vector whose magnitudes and directions are determined;
    wherein the power distribution unit comprises:
    a base station communication unit for receiving a third precoding vector calculated by a base station neighboring the base station from the neighboring base station; and
    a reverse channel coefficient calculator for calculating effective reverse channel coefficients for the first terminal and the second terminal using the channel information, the third precoding vector, and a variance of background noise,
    wherein power components are allocated to the first precoding vector and the second precoding vector using the effective reverse channel coefficients.

12. The base station of claim 11, wherein the vector direction configuration unit calculates the first precoding vector and the second precoding vector using a zero-forcing (ZF) method.

13. The base station of claim 11, wherein the power distribution unit allocates power components to the first precoding vector and the second precoding vector using the effective reverse channel coefficients through a water-filling technique.

14. The base station of claim 11, wherein the first terminal is positioned in coverage of the base station and coverage of the neighboring base station, and the second terminal is positioned in coverage of the base station and outside coverage of the neighboring base station.

15. The base station of claim 11, further comprising a channel information storage unit for storing the channel information and delivering the stored channel information to the vector direction configuration unit and the reverse channel coefficient calculator.

* * * * *